(12) United States Patent
Miskovich (10) Patent No.: US 9,371,938 B2
(45) Date of Patent: Jun. 21, 2016

(54) MODULAR CONSTRUCTION CONDUIT UNIT

(71) Applicant: Joseph S. Miskovich, Fenton, MI (US)

(72) Inventor: Joseph S. Miskovich, Fenton, MI (US)

(*) Notice: Subject to any disclaimer, the term of this patent is extended or adjusted under 35 U.S.C. 154(b) by 0 days.

(21) Appl. No.: 14/643,118

(22) Filed: Mar. 10, 2015

(65) Prior Publication Data

US 2015/0260313 A1  Sep. 17, 2015

Related U.S. Application Data

(60) Provisional application No. 61/951,771, filed on Mar. 12, 2014.

(51) Int. Cl.

| | |
|---|---|
| *F16L 1/11* | (2006.01) |
| *F16L 57/06* | (2006.01) |
| *B23P 19/00* | (2006.01) |
| *E03F 1/00* | (2006.01) |
| *E04F 15/12* | (2006.01) |
| *E04B 5/32* | (2006.01) |
| *E04B 5/36* | (2006.01) |

(52) U.S. Cl.
CPC . *F16L 1/11* (2013.01); *B23P 19/00* (2013.01); *E03F 1/005* (2013.01); *E04B 5/326* (2013.01); *E04B 5/36* (2013.01); *E04F 15/123* (2013.01); *F16L 57/06* (2013.01); *Y10T 29/49826* (2015.01)

(58) Field of Classification Search
CPC ............. F16L 1/11; F16L 57/06; B23P 19/00
See application file for complete search history.

(56) References Cited

U.S. PATENT DOCUMENTS

| | | | |
|---|---|---|---|
| 1,529,019 A | | 3/1921 | Evans |
| 4,652,170 A | * | 3/1987 | Lew .............................. 403/381 |
| 4,919,568 A | | 4/1990 | Hurley |
| 5,087,151 A | | 2/1992 | DiTullio |
| 5,241,979 A | | 9/1993 | Chang |
| 5,322,387 A | | 6/1994 | Heine et al. |
| 5,445,730 A | | 8/1995 | Pattee |
| 5,890,838 A | | 4/1999 | Moore, Jr. et al. |
| 6,062,767 A | | 5/2000 | Kizhnerman et al. |

(Continued)

FOREIGN PATENT DOCUMENTS

| | | |
|---|---|---|
| EP | 0803618 A2 | 10/1997 |
| EP | 1932975 A1 | 6/2008 |

(Continued)

OTHER PUBLICATIONS

European Intellectual Property Office, International Search Report and Written Opinion in corresponding International application No. PCT/US2015/019668 dated Jun. 10 2015.

*Primary Examiner* — Tara M. Pinnock (74) *Attorney, Agent, or Firm* — Young Basile Hanlon & MacFarlane P.C.

(57) ABSTRACT

A modular conduit unit system and method for exemplary uses in routing utility lines and storage management of fluids. The modular conduit units may include independent dome-shaped structures including four orthogonally oriented openings and internal chambers. On connection of many conduit units, multiple passageways are created for routing utility lines through the modular structure. Closure panels may be selectively installed to close off the conduit units and passageways for underground storage of fluids or other materials. The modular units are capable of being encased by materials including concrete for underground and concrete floors and walls of commercial buildings.

13 Claims, 12 Drawing Sheets

(56) References Cited

U.S. PATENT DOCUMENTS

| | | | |
|---|---|---|---|
| 6,132,139 A | 10/2000 | Hashimoto et al. | |
| 6,379,541 B1 | 4/2002 | Nicholas | |
| 6,383,372 B1 | 5/2002 | Houck et al. | |
| 7,226,241 B2 | 6/2007 | DiTullio | |
| 7,604,133 B2 * | 10/2009 | Tsai | 211/194 |
| 7,744,756 B2 | 6/2010 | Davis, Jr. | |
| 7,806,627 B2 | 10/2010 | DiTullio | |
| 7,887,256 B2 | 2/2011 | Miskovich | |
| 8,147,688 B2 | 4/2012 | Adams et al. | |
| 2003/0070977 A1 | 4/2003 | Anderson | |
| 2004/0131416 A1 * | 7/2004 | Wu et al. | 403/170 |
| 2004/0184884 A1 | 9/2004 | DiTullio | |
| 2004/0253054 A1 | 12/2004 | Atchley | |
| 2006/0233612 A1 | 10/2006 | DiTullio | |
| 2007/0258770 A1 | 11/2007 | Miskovich | |
| 2008/0035547 A1 | 2/2008 | Miller | |
| 2008/0181725 A1 | 7/2008 | Miskovich | |
| 2009/0180834 A1 | 7/2009 | Hedstrom et al. | |
| 2009/0261036 A1 | 10/2009 | Lucas | |
| 2010/0059430 A1 | 3/2010 | Adams et al. | |
| 2013/0008841 A1 | 1/2013 | Miskovich | |

FOREIGN PATENT DOCUMENTS

| | | | |
|---|---|---|---|
| EP | 1953297 A2 * | 8/2008 | E03F 1/00 |
| EP | 2322733 A1 | 5/2011 | |
| NL | 1020177 C2 | 9/2003 | |
| WO | 03069074 A1 | 8/2003 | |

* cited by examiner

MODULAR CONSTRUCTION CONDUIT UNIT

CROSS-REFERENCE TO RELATED APPLICATIONS

Applicant claims priority benefit to U.S. Provisional Patent Application No. 61/951,771 filed Mar. 12, 2014, the entire contents of which is incorporated herein by reference.

BACKGROUND

In large commercial and residential construction projects, accommodations must be made for utility lines and storm water run-off management. For example in commercial building structures, utility lines and cables such as electrical lines, natural gas lines, and communications lines need to be installed in the interior and the exterior of the buildings and connected to local grids and service lines. Inside multi-story commercial buildings, these lines and cables are often routed below floors, above suspended ceilings or within columns and walls inside of buildings. Where routed below floors, architects and civil engineers often have to provide elevated, semi-permanent floor structures to access and route such lines or permanently mount hollow conduits or pipes in the individual concrete floors so lines can initially be installed or future lines routed and serviced.

Further, respecting commercial and residential building structures, storm water, collection, management and retention structures are of increasing concern due to potential environmental impacts of such construction projects. Exterior storm water management systems are often below-grade structures, and are used to manage storm water run-off from impervious surfaces such as roofs, sidewalks, roads, and parking lots. Sub-surface water collection and storage chamber systems can be designed to retain storm water run-off and allow for a much slower discharge of storm water effluents. As an example, such systems can be constructed underneath vehicle parking lots and structures, such that the storage chamber system receives water from drain inlets or other structures, and discharge it over time. An example of existing exterior stormwater devices is the Triton Stormwater Solutions chamber management systems.

The design and installation of conventional underground stormwater chamber solutions is challenging due to many factors. For example, as underground systems, the space or footprint of the large and lengthy chambers is restricted by the land owned and available for use by these systems. Where a large rectangular space is not available at a site for parallel orientation of multiple chambers, irregular configurations and less than optimal orientations of the chambers are necessary to maximize the spatial volume to retain and gradually disburse the stormwater or other water run-off.

There is a need for a robust modular conduit unit structure that provides an interior chamber which can be selectively configured to provide multi-directional pathways for routing of interior and exterior lines and serve as a retention chamber for the gradual diffusion of fluids to the environment.

SUMMARY

Examples of a modular conduit unit for use in creating modular conduit unit structures is disclosed. The applications for the present invention are many and range from use in routing utility lines and cables in concrete floors and walls of commercial buildings to forming underground storm water management and distribution systems. The inventive units and modular structures can be stand along structures, buried under earth or stone or encased in concrete or other materials for permanent application in permanent structures such as high rise commercial buildings.

In one example of the invention, each modular conduit unit has a domed shaped structure and four leg design forming a self-standing, strong unit. The exemplary unit includes four sides with arches extending outward and defining four openings, a pair of openings opposing each other along a respective first or second chamber axis. The unit provides a hollow, interior chamber in communication with the openings.

On connection of the two modular conduit units, extended passageways are formed through the openings for routing of utility lines, cables or other equipment through the passageways. The modular units can be connected to form typical and irregular geometric structures to accommodate the space or footprint provided by a building site. The modular units and connected modular structures can be backfilled around, buried or encased in materials such as concrete while preserving the open passageways for routing or providing an interior storage volume.

Closure panels can be selectively connected to cover selected openings in the unit to customize the structure or completely close it off as a storage volume.

In an exemplary method of forming a modular conduit unit, several individual modular conduit units are connected together to form a first and alternately an additional second passageway through the units for exemplary uses of routing utility lines or managing stormwater runoff. Closure panels may be added to close off selected portions of the units or terminate the through passageways.

Other examples and applications of use of the present invention will be recognized and understood by those skilled in the art on reading the below description and drawings herein.

BRIEF DESCRIPTION OF THE DRAWINGS

The description herein makes reference to the accompanying drawings wherein like reference numerals refer to like parts throughout the several views, and wherein.

DETAILED DESCRIPTION OF A PREFERRED EMBODIMENT

An exemplary modular construction conduit unit 100 and methods is shown in exemplary configurations, applications and accessories in FIGS. 1-15.

Referring to the examples shown in FIGS. 1-5, conduit 100 is a four-legged domed structure having a first side 101, second side 102, third side 103 and a fourth side 104 as generally shown. In the preferred example, conduit 100 includes a bottom portion 108 and a dome-shaped top portion 110 having an apex 111 along a longitudinal axis 113 as generally shown. The top portion 111 radially and gradually slopes down toward four legs 120 ending in foot pads 124 as generally shown.

In the example, the top portion 110 is configured such that, when the conduit unit is covered with a material, for example with gravel, stone or dirt, the material will not easily collect on top of the top portion 110. Instead, the preferred domed shape of the top portion 110 naturally directs the material under the force of gravity to all sides of the conduit 100, thus allowing for even backfilling and distribution of weight around the conduit 100.

In the example shown, conduit unit 100 includes a plurality of formations 112 and 114. In the example shown, formations 112 are in the form of ribs and are continuous with the top portion including apex 111. Exemplary formations 114 are shown in the form of depressions at a lower surface than ribs 112. The formations 112 and 114 and gradual slope of top portion assist in the dispersion of backfill described above and add strength, stiffness and aesthetic qualities of the unit 100. It is understood that exemplary formations 112 and 114 can be in different numbers and take other forms, shapes and configurations than those shown in FIGS. 1-14 depending on the performance and load bearing specifications, environmental applications, material selection and aesthetic considerations.

FIGS. 1-5 show an exemplary modular conduit unit 100. The vault unit 100 can be made of plastic, composites or other materials known by those skilled in the art. As best seen in the example in FIGS. 1-3 and 7, the conduit unit 100 preferably includes four legs 120 that each extend downward from the top portion 110, each positioned at a respective corner of the conduit 100 where pairs of the first side 101, the second side 102, the third side 103, and the fourth side 104 meet. In the preferred example shown, each of the legs 120 includes a formation 122 extending down the length of the leg 120. It is understood that formation 112 may vary as previously described above for formations 112 and 114. In the example, legs 120 angle downwardly and radially outwardly from longitudinal axis 113. It is understood that legs 120 may extend at other angles and orientations as known by those skilled in the art.

In the example, each leg 120 terminates at a foot pad 124 having, for example, a generally planar surface that is configured to contact an underlying surface 125 and thereby support the conduit unit 100. The foot pads 124 can be configured to help align the conduit 100 during installation, by placing the conduit units 100 such that the edges of foot pads 124 on adjacent vault units 100 are positioned closely adjacent to one another and in a proper orientation for engagement as described below and generally shown in FIG. 7.

Figure 2:
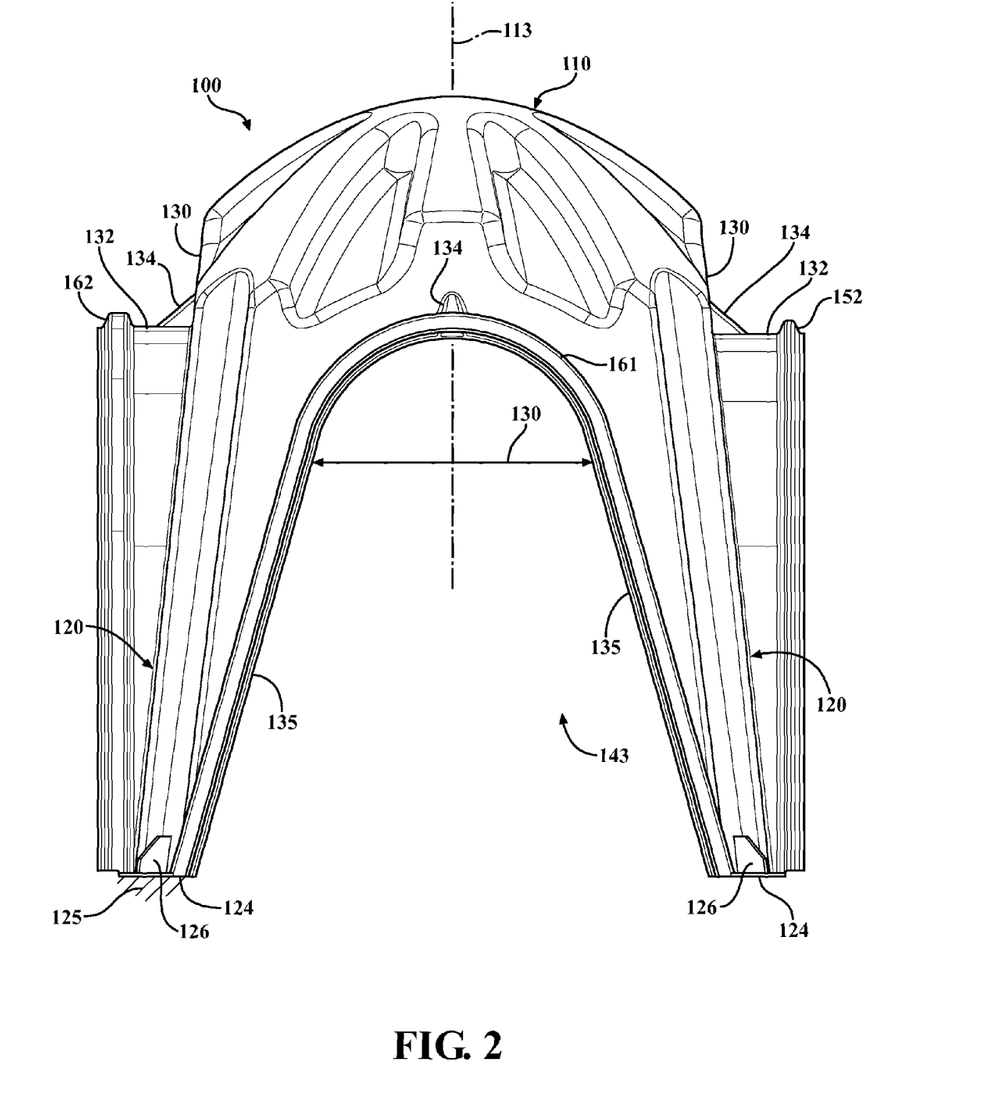
FIG. 2 is a front view of the conduit unit shown in FIG. 1.
Figure 3:
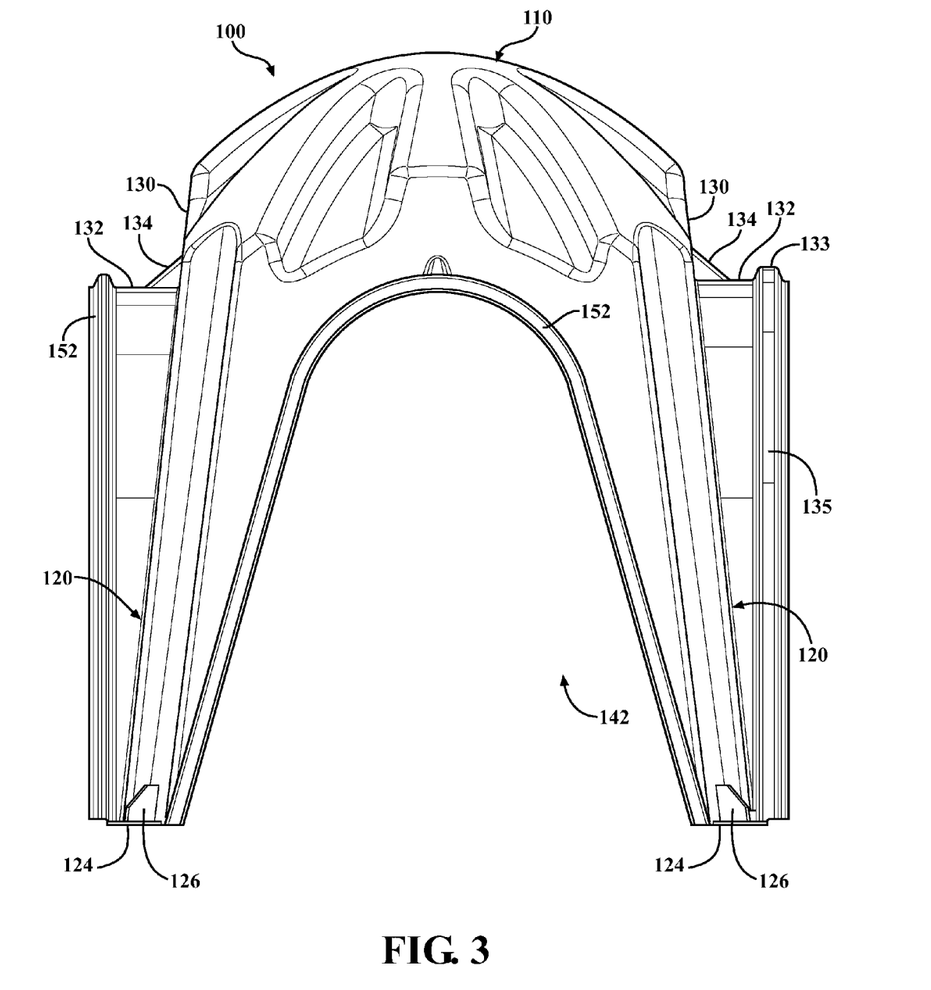
FIG. 3 is a rear view of the conduit unit shown in FIG. 1.

In the preferred example as best seen in FIGS. 2 and 3, a plate member 126 interconnects each of the legs 120 with the respective foot pad 124. Each plate member 126 is a generally planar member that extends upward from and substantially perpendicular to the respective foot pad 124. The plate members 126 can each extend in a direction that is aligned radially with the center and longitudinal axis 113 of the vault unit 100. The plate members 126 each serve to stiffen the legs 120 and the foot pads 124. The plate members 126 can also help the vault units 100 to keep their shape prior to installation, such as when the vault units 100 are stacked for shipping. The plate members 126 can also serve a locating function, as will be described further herein. It is understood that structures other than plate member 126 may be used where needed to reinforce the joint between the legs 120 and foot pads 124. Where performance specifications or other factors do not require it, plate 126 can be eliminated.

In the illustrated preferred example of conduit unit 100, each of the first side 101, the second side 102, the third side 103, and the fourth side 104, define a generally planar surface 130. Each surface 130 is bordered by a pair of the legs 120 and the top portion 110. An upstanding arch 132 extends axially outward along a first chamber axis 128 or second chamber axis 129 which preferably intersect longitudinal axis 113 as generally shown. In the example, each arch 132 includes a circular portion 133 at its top and straight portions 135 that each extend downward from a respective side of the circular portion 133 toward the bottom of the conduit unit 100, and taper laterally outward from the respective chamber axis 128 or 129 toward the corners of the conduit unit 100

In the example, each side 102, 102, 103 and 104 each include a diverter connecting one of the generally planar surfaces 130 with a respective one of the upstanding arches 132 as generally shown. Each diverter member is positioned at the top of one of the upstanding arch members 132, and extends upward from the arch member 132 and inward toward the respective generally planar surface 130. The upper surfaces of each diverter member slope axially outward along a respective chamber axis 128 or 129 in a pyramidal configuration. Preferably, the diverter members 134 are configured such that, when the conduit 100 is covered with a material such as by backfilling with gravel, stone, concrete or dirt, the material will not collect on top of each arch member 132, but instead is directed to the sides of each arch member 132, thus allowing for even backfilling around the vault unit 100 and undue stress on the arch 132 until the conduit is properly surrounded and positionally stabilized by the backfill material.

In the exemplary conduit unit 100, the top portion 110 and sides 101-104 define a hollow interior chamber 138 beneath top portion 110.

Figure 1:
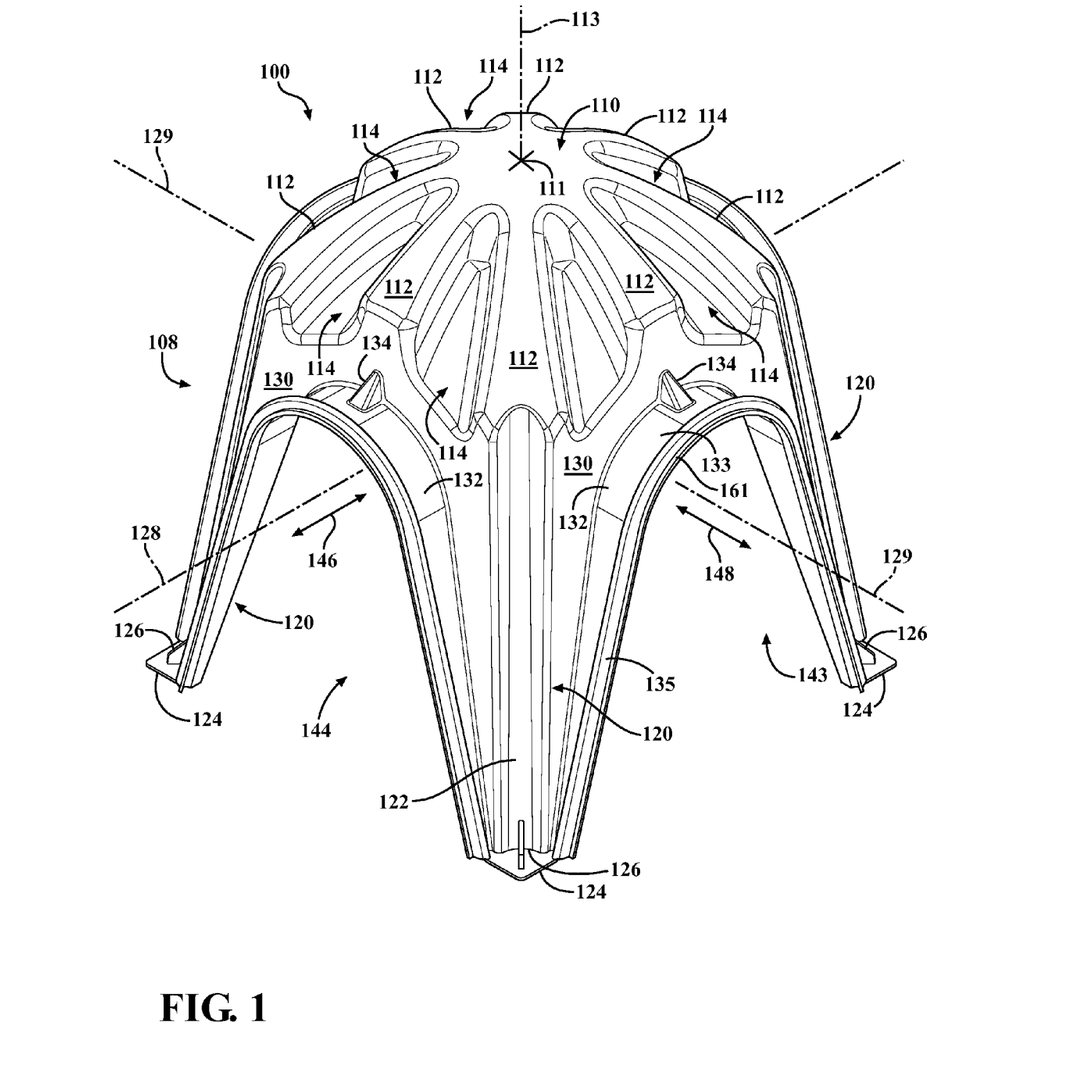
FIG. 1 is a perspective view showing an example of a single modular conduit unit.

Referring to FIGS. 1-3, the conduit unit 100 preferably defines four openings that are each positioned between a respective pair of the legs 120. In the exemplary unit 100, a first opening 141, a second opening 142, a third opening 143, and a fourth opening 144 are formed on each of a respective first side 101, the second side 102, the third side 103, and the fourth side 104. The first through fourth openings 141-144 are each bordered by or defined by a respective one of the arch members 132 and are in communication with interior chamber 138. Thus, in the example, each of the first through fourth openings 141-144 can each be substantially arch-shaped. For example, each arch-shaped opening includes a circular portion 133 having a diameter 130 and straight portions 135 defining a periphery 136. In a preferred example, straight portions extend angularly outward such that at the bottom of the opening, the opening distance between the legs 120 is larger than the circular portion and diameter. It is understood that the arches 132 and openings 141-144 can take other shapes, sizes and orientations as known by those skilled in the art.

In a preferred example, the opposing first 141 and fourth 144 openings are substantially aligned along first chamber axis 128 defining a first through passage 146 along first chamber axis 128. Similarly, second 142 and third 143 openings are substantially aligned along second chamber axis 129 and define a second through passage 148 as generally shown.

Figure 4:
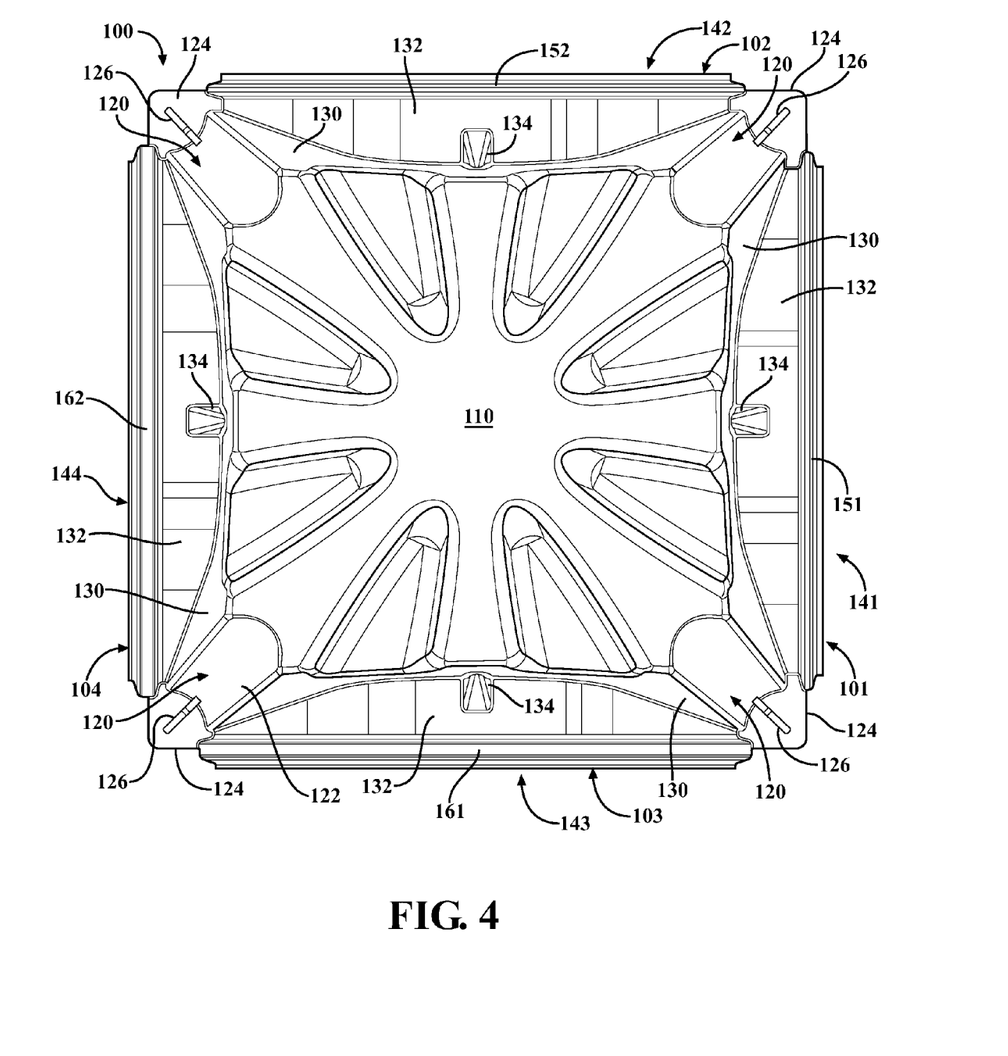
FIG. 4 is a top view of the conduit unit shown in FIG. 1.
Figure 5:
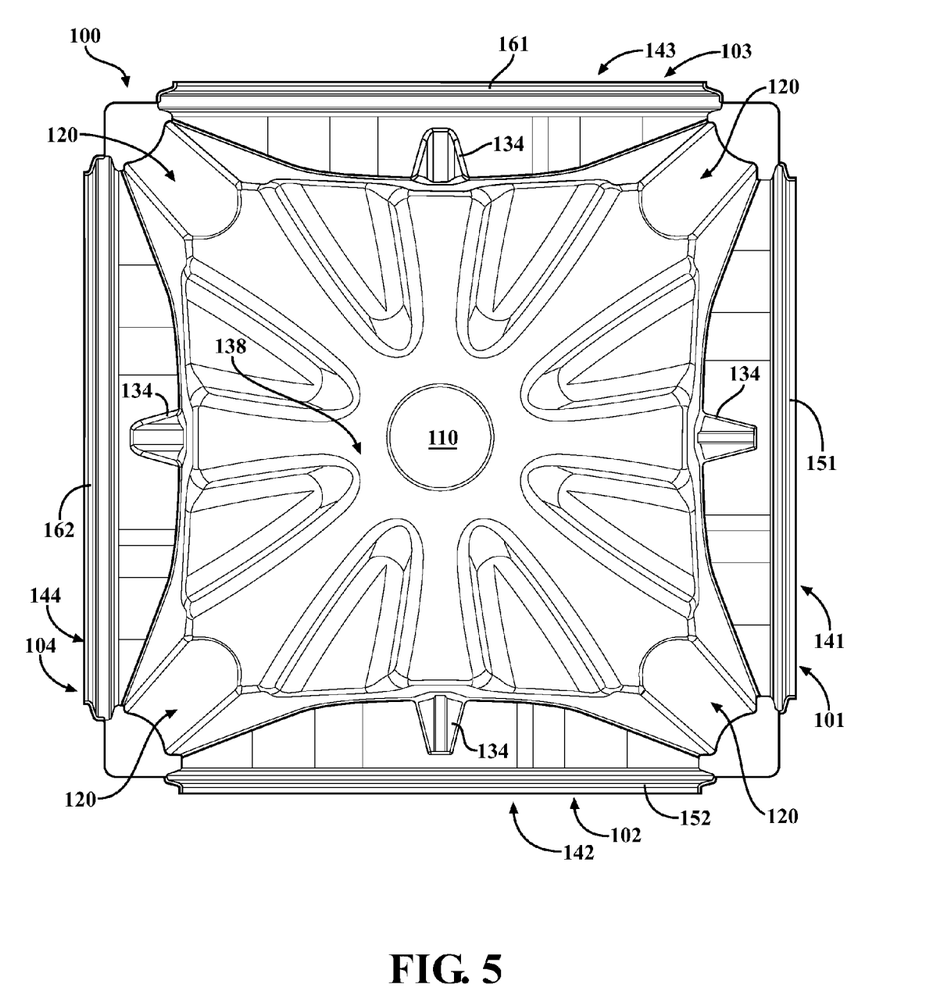
FIG. 5 is a bottom view of the conduit unit shown in FIG. 1.

In the exemplary and preferred modular conduit unit 100 illustrated, each conduit unit 100 includes connecting structures that allow the unit 100 to be connected to similar or identical conduit units 100. In one example of a conduit unit 100 connecting structure and as best seen in FIGS. 4 and 5, two first connector portions in the exemplary form of or a first male connector 151 and a second male connector 152 border the first opening 141 and the second opening 142 respectively as best seen in FIG. 4 In a preferred example, first connector portions 151 and 152 are integrally formed in respective arches 132 on adjacent sides and are upstanding, generally rounded portions extending radially outward from respective chamber axes 128 and 129.

In a preferred example of conduit 100, two second connector in an exemplary form of female connector 161 and a second female connector 162 border the third opening 143 and the fourth opening 144 respectively on the respective arch members 132.

As used herein, the terms "male" and "female" indicate structures that are configured to be complementary and connectable to each other in either a removable or permanent nature. Thus, "male" structures have geometrical configurations that are complementary to female structures. The terms "male" and "female" are not, however, intended to imply or be limited to any particular structure. It is understood that the illustrated first and second male and first and second female connectors may take other forms, shapes or configurations as known by those skilled in the art. It is further understood that other structures and methods of connecting conduit units 100 together may be used, for example, mechanical fasteners including bolts, nuts, screws, rivets and other mechanical fasteners known by those skilled in the art. It is also contemplated that other methods and devices such as staking, use of adhesives and other methods to removably or permanently connect or bond the units 100 together may be used.

Figures 6A, 6B:
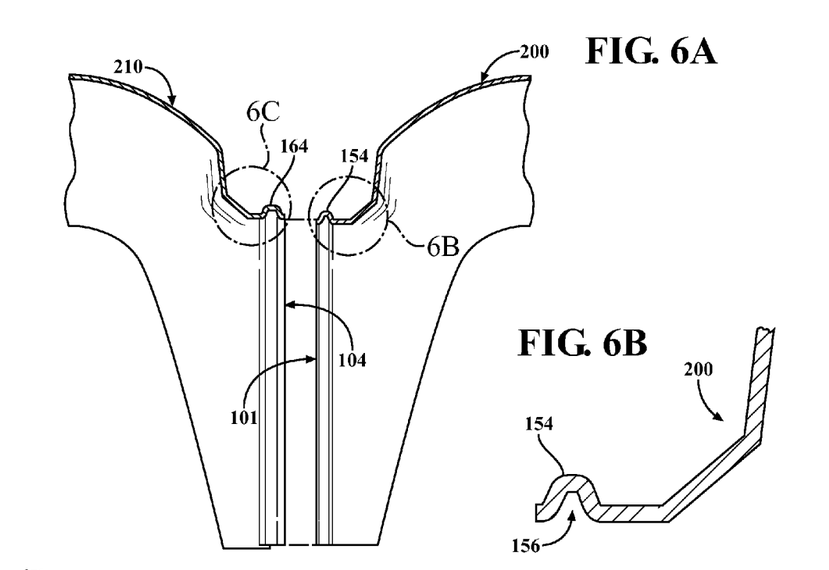
FIG. 6A is an exemplary exploded cross-section views showing a first conduit unit and a second conduit unit in a disengaged position and an engaged position respectively.
FIG. 6B is an exemplary cross-section view showing the conduit units in FIG. 6A engaged.

In a preferred example as best seen in FIGS. 6A-6D, each of the exemplary first 151 and second 152 male connectors include at least one protrusion 154 having an exemplary rounded configuration, and the first 161 and second 162 female connectors having an exemplary recess or channel configuration that is complementary in shape to the first connector portion. In a preferred example, the at least one protrusion 154 defined by the first connector portions 151, 152 is an elongate lip that extends along the respective arch member 132, and the at least one channel defined by the second connecting portions 161, 162 is an elongate channel that extends along the respective arch member 132, wherein the elongate lip of each respective first connector portion 151, 152 is receivable in the elongate channel of each respective second connector portion 161, 162 on a connecting conduit unit 100. As another example, the at least one protrusion 154 defined by the first connector portion 151, 152 may be in the form of a plurality of radially extending posts that are arrayed along the respective arch member 132, and the at least one channel defined by the second connector portion 161, 162 may be a plurality of complementary apertures that are arrayed along the respective arch member (not shown). As generally shown in FIG. 6B, preferably a continuous recess or channel 156 is formed on the opposing side of the material opposite the rounded protrusion 154.

In a preferred example as best seen in FIG. 4, the first male connector 151 and the second male connector 152 are located on the first side 101 and the second side 102, respectively, and thus are on adjacent sides that are generally orthogonal to one another. Similarly, the first female connector 161 and the second female connector 162 are located on the third side 103 and the fourth side 104, respectively, and thus are on adjacent sides that are generally orthogonal to one another. In the preferred example and configuration the male and female connecting structures are positioned opposite one another along respective channel axes 128 and 129 on the conduit unit 100. This allows multiple units to be connected together easily in any desired direction while maintaining consistent orientation of the multiple vault units. It is understood that different configurations or combinations of the first connector and second connector portions may be used to suit the particular application and desired configuration of portions or a complete conduit system.

In a preferred example, modular conduit unit 100 is a thin-walled, unitary one-piece structure formed of plastic resin in a molding process. In a preferred example, the unit 100 is 36 inches tall and 30 inches on a side between outermost portions of foot pads 124. It is understood that other polymers, composite resins, non-ferrous metals and other materials known by those skilled in the art may be used. It is further understood that conduit unit 100 may be of different sizes, shapes and configurations and by different processes than that shown and described in the examples, to suit the particular application and performance and environmental specifications.

FIGS. 6A-6D show an exemplary first conduit unit 200 and a second conduit unit 210 in a disengaged position (FIG. 6A), and an engaged position (FIG. 6B). The first conduit unit 200 and the second conduit unit 210 are as described with respect to the conduit unit 100 and first and second connector portions previously described and illustrated.

Figures 6C, 6D:
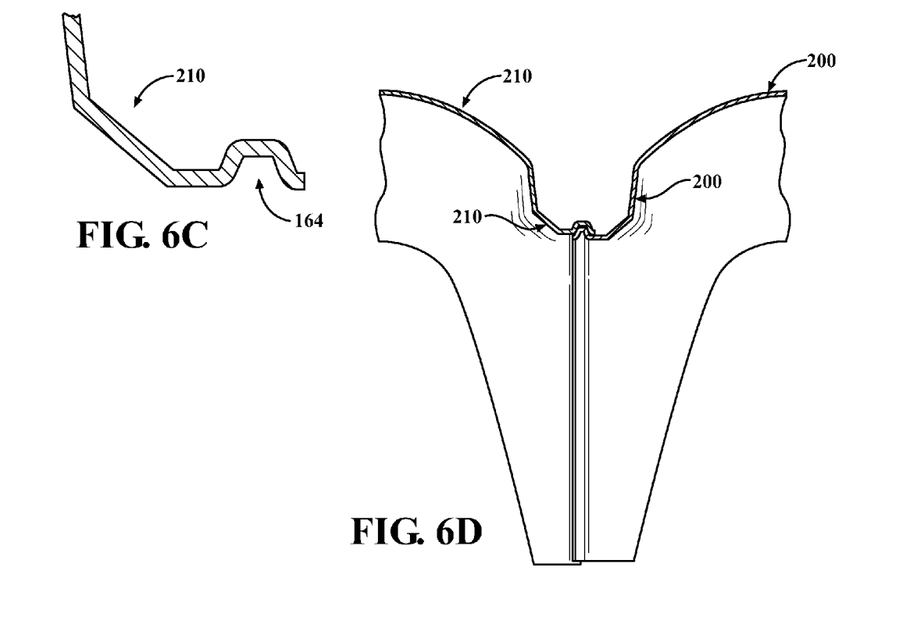
FIG. 6C is an enlarged portion in the area C in FIG. 6A.
FIG. 6D is an enlarged portion in the area of D in FIG. 6A.

In an exemplary connection of a first 200 and a second 210 conduit unit, a first side 101 of first conduit unit 200 channel 164 is generally aligned along channel axis 128 with a fourth side 104 of a second conduit unit 210. Due in part to the angularly sloped portions of arches 132 and complementary first and second connector portions, the second conduit unit 210 can be raised along longitudinal axis 113 and lowered down over arch 132 of the first conduit unit 200 to engage the second connector portion channel 164 with the first connector portion protrusion 154 as generally shown in FIG. 6D. The same or similar process is used to connect additional modular conduit units 100 to the second 102 and third 103 sides by aligning the complementary first and second connector portions of the additional units 100. Other methods to align and engage the first and second connector portions known by those skilled in the art may be used.

Figure 7:
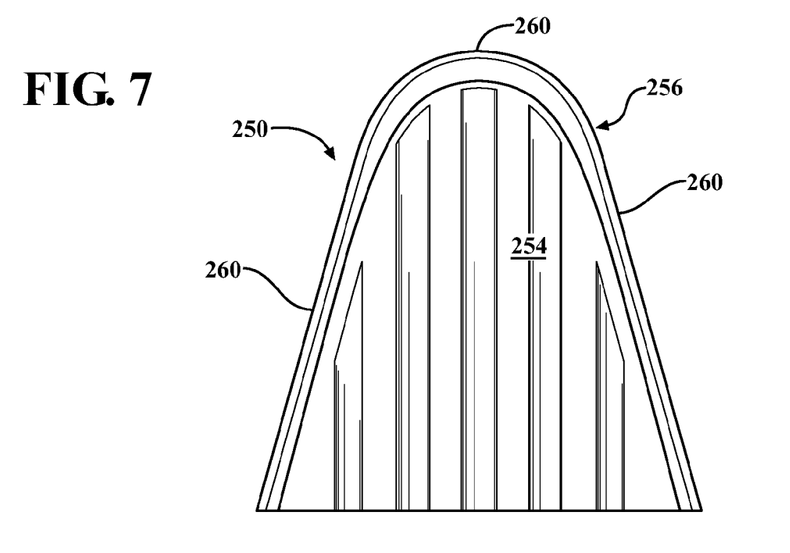
FIG. 7 is a front view of an exemplary conduit unit closure panel.
Figure 8:
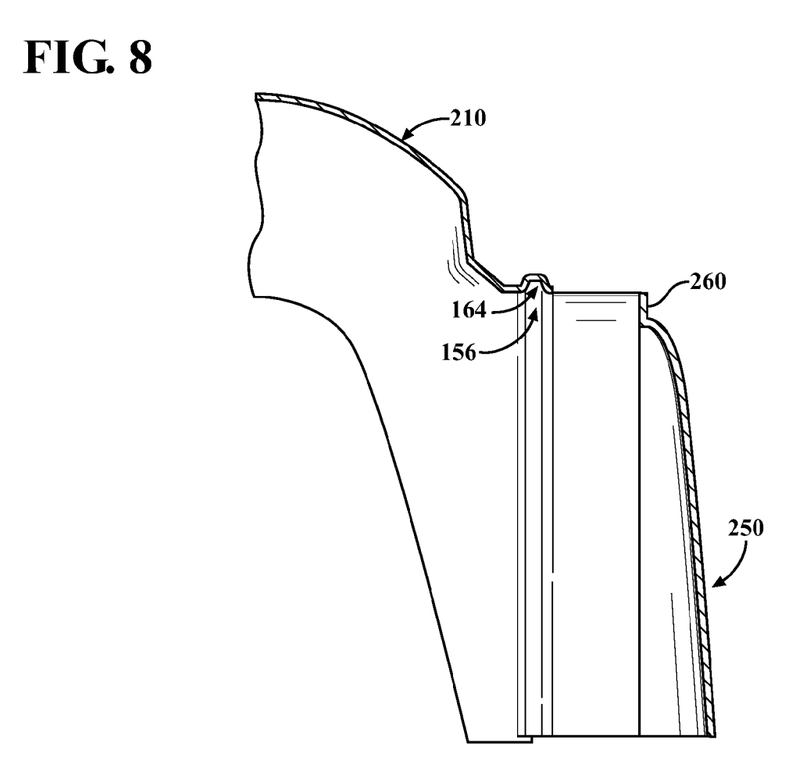
FIG. 8 is a cross-section exploded view showing an example of a conduit unit and a closure panel.

Referring to FIG. 7 an exemplary closure panel or door 250 is shown. In the example, closure panel 250 includes a contoured surface 254 and a periphery 256 that is substantially sized and shaped to cover a respective one of the first 141, second 142, third 143 or fourth 144 openings in conduit 100. Closure panel 250 surface 254 is preferably contoured to deter collection of backfill material on the panel as described above. It is understood that surface 254 may take other shapes, configurations and sizes to compliment the structures of conduit 100 and to accommodate the performance specifications and application as known by those skilled in the art.

Figure 10:
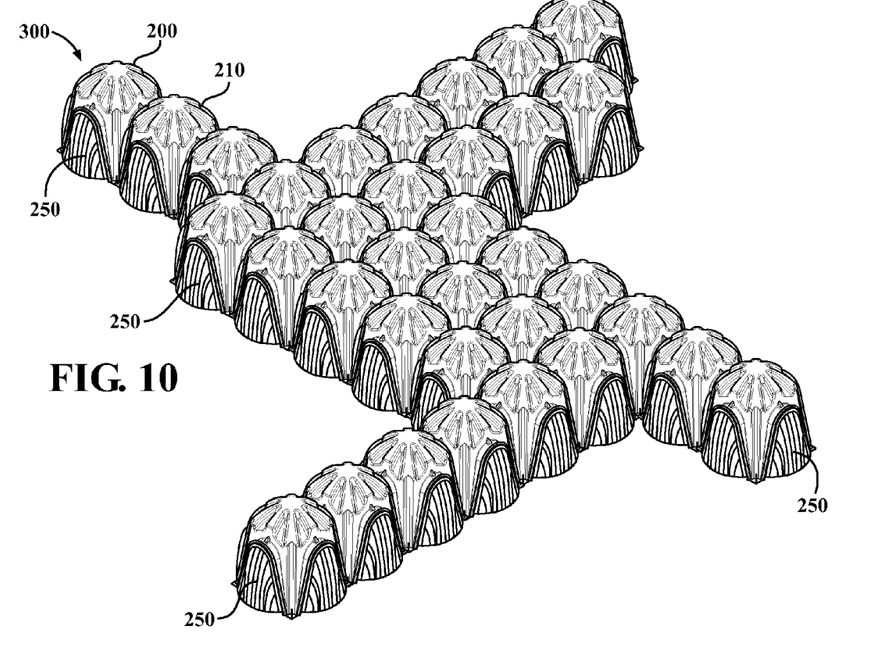
FIG. 10 is a perspective view showing an example of a large number of conduit units connected together and selective application of exemplary closure panel structures.

In one example, panel 250 periphery 256 includes a third connector portion which is complementary and engageable with either of the unit 100 first connector or second connector portions, for example the channel 164 or protrusion 154. In a preferred example best seen in FIG. 8, closure panel third connector portion includes an upstanding flange or lip 260 extending substantially along the entire periphery 256.

Where it is desired to close off a conduit opening 141, 142, 143 and/or 144, for example where multiple conduit units 100 are used as a stormwater retention and distribution system, one closure panel 250 may be used for a respective opening as generally shown in FIG. 10. Closure panel 250 is installed in a similar way to the addition and connection of a second conduit unit 210 as described above. In the preferred example, flange 260 is oriented with a respective opening and flange 260 is inserted into channel 164 or recess 156 to engage the panel 250 to the conduit unit 100. In an alternate example not shown, periphery 256 may include a channel or recess complementary to and that overlaps and engages protrusions 154 or similar formations on a respective arch 132. It is understood that closure panel 250 can be connected to conduit 100 in different ways through fasteners and other methods described above for connection of multiple conduit units 100.

In another example of modular conduit unit 100, a bottom or floor panel (not shown) may be used to partially or substantially cover or close the normally open portion between conduit legs 120 and in the areas of the openings 141-144. The exemplary floor panel may be an independent panel or integrally formed with the other portions of conduit 100. Where not integral, connector structures may be included to removably or permanently secure the floor panel to the conduit unit 100, for example foot pads 124, by methods described above or known by those skilled in the art. The exemplary floor panel can be generally planer or have formations or contours to suit the particular application or performance specifications.

As described, in a preferred application or method of use, a plurality of individual modular conduit units 100 are selectively connected together along one or both of channel axes 128 and 129 forming one or a plurality of first 146 and/or second 148 through passages where closure panels 250 are not used. As described and best seen in FIG. 12, each conduit unit 100 includes a hollow chamber 138. As additional conduit units 100 are added and connected, the through passage 146 and/or 148 increases in length as does the volume of the combined hollow chambers providing for increased retention, for example in a stormwater retention system.

Figure 9:
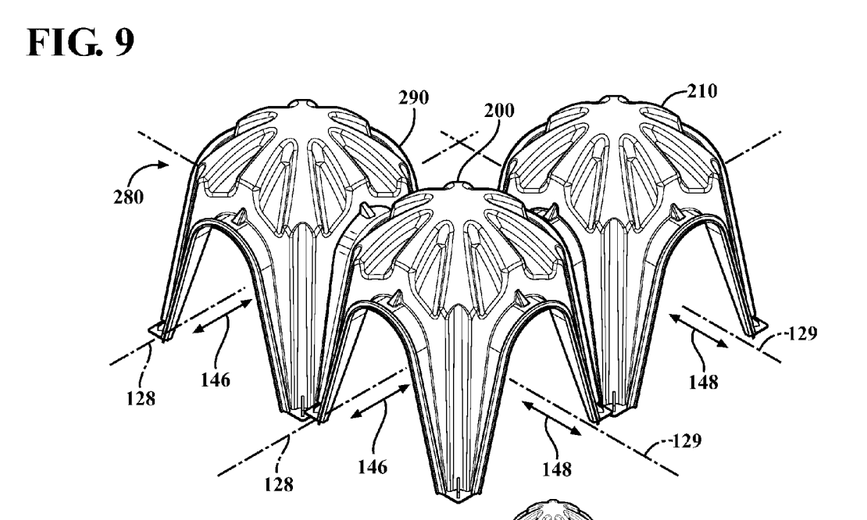
FIG. 9 is a perspective view showing an example of three conduit units connected together along two channel axes.

In an exemplary application as shown in FIG. 9, an exemplary structure 280 is shown. In the example, three conduit units 100, a first 200, a second 210 and a third 290 are connected together along first 128 and second 129 axes forming multiple first 146 and second 148 through passages, for example routing of lines or cables in a commercial building.

In an alternate modular conduit structure 300 example shown in FIG. 10, a plurality of individual modular conduit units 100 are connected together along multiple first 128 and second 129 axes to form a plurality of first 146 and second 148 through passages and hollow chambers 138 inside the structure 300. In the example, many of the exterior or peripheral units 100 include closure panels 250 on two or more of the respective openings 141-144. As described, the modular conduit units 100 structures may take many geometric forms to accommodate the space at an application site and to meet performance and environmental specifications.

Figure 11:
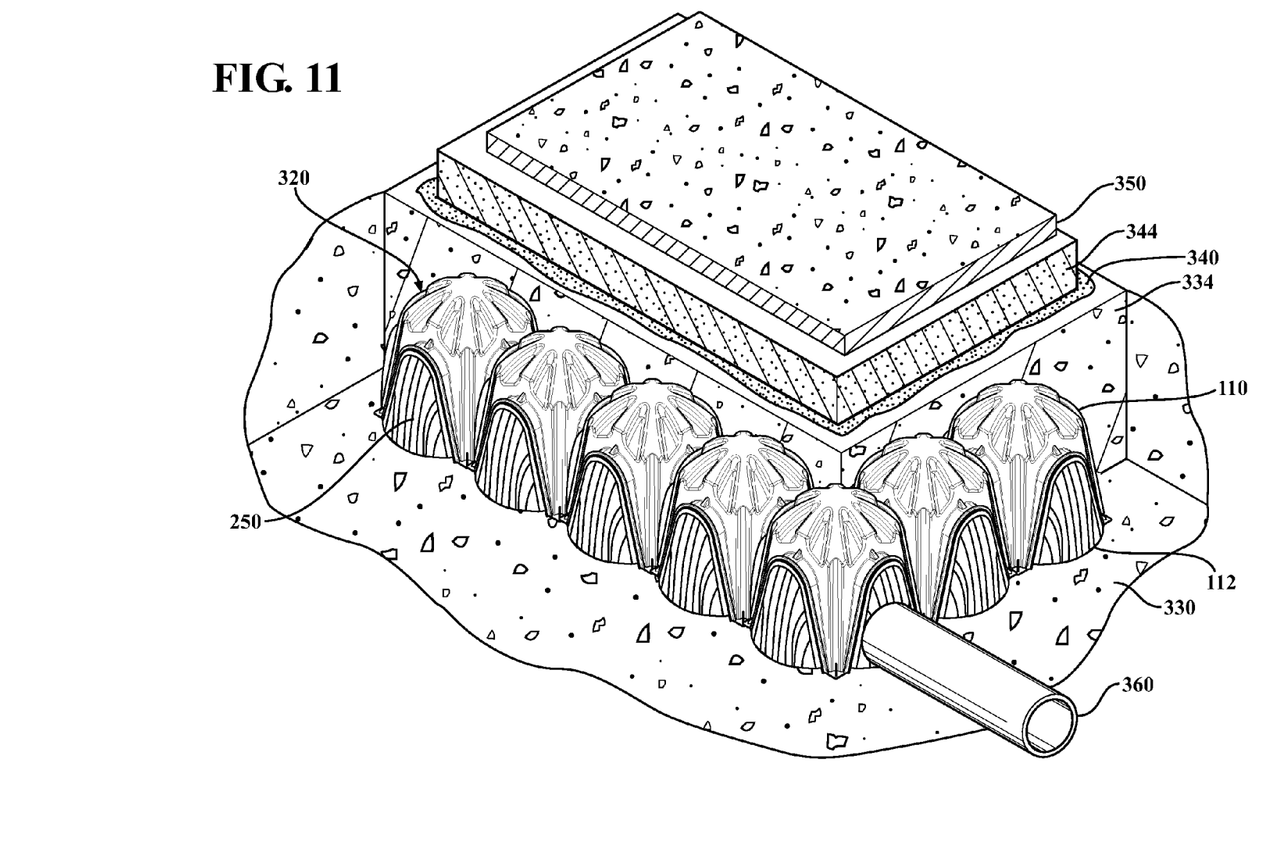
FIG. 11 is a perspective view showing an exemplary application of multiple conduit units and doors configured as a below-grade water retention and dispersion structure.

FIG. 11 shows an alternate example conduit unit structure 320 that is being utilized as below-grade water detention structure which is placed under, for example, a parking lot. The exemplary conduit structure 320 includes multiple conduit units 100 that are connected together along both axis 128 and 129, and selectively provided with closure panels 250 1120 to close or seal unconnected openings 141-144, thereby defining an enclosed interior volume defined by the plurality of interior hollow chambers 138. In the example, the plurality of conduit units 100 are placed on top of a first layer of porous material 330, such as gravel, stone, sand, and or other materials, and are surrounded or backfilled by a second layer of porous material 334. Additional upper layers may include for example a geotextile layer 340, a base layer 344, and a pavement layer 350 (for example, asphalt or concrete). In the example, a fluid inlet pipe 360 extends through one of the closure panels 250 for ingress and/or egress of fluid to and from the interior volume defined by the interior hollow chambers 138. As described, closure panels 250 may be selectively used to close off certain or all of the first 146 and second 148 through passages on the exterior or interior of the unit structure. In one example and application, after water enters the conduit structure 320 via the inlet pipe 360, the water subsequently exits the conduit structure 320 by infiltration into and through the first layer of porous material 330.

Depending on the application, it is understood that other structures and methods may be used to ingress, egress or manage fluids from the exemplary modular conduit structures described and contemplated herein. In an example not shown, a row or multiple rows of connected conduit units 100 along an axis 128 or 129 can be connected and used to form a header row or chamber to initially collect stormwater before being allowed to pass from the header row of units 100 to secondary or overflow chambers defined by additional connected units 100 connected to the header row by transfer pipes through door closure panels 250 or direct connection of additional units 100 as described herein. For example, see published U.S. patent application Ser. No. 13/135,581 filed Jul. 9, 2011 by the present inventor and incorporated herein by reference. Other configurations and applications known by those skilled in the art may be used.

Figure 12:
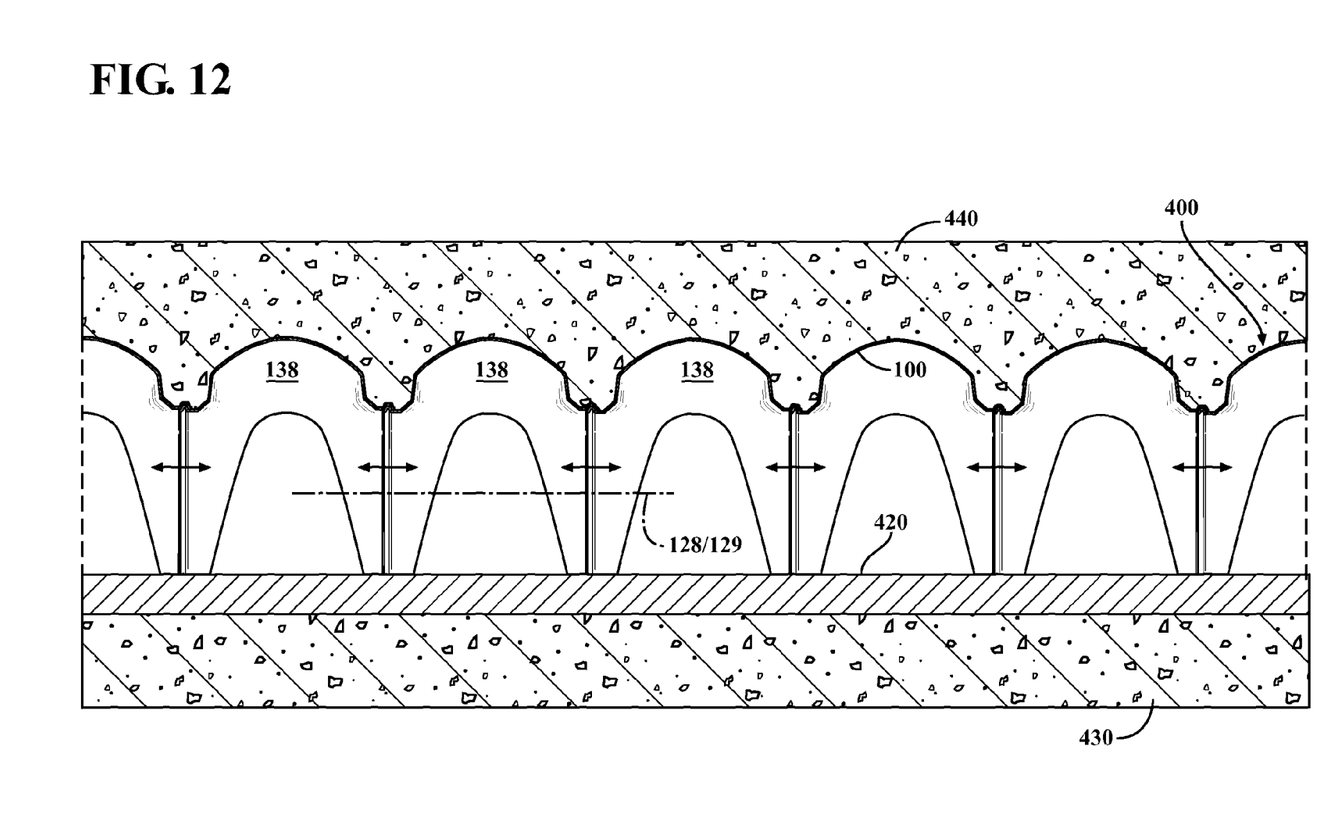
FIG. 12 is a cross-sectional schematic view showing an example of multiple conduit units encased in concrete and in an exemplary application for routing a utility line.

FIG. 12 is a schematic cross-section view showing an exemplary conduit structure 400 that may be utilized for routing a utility line 420. The exemplary conduit structure includes a plurality of conduit units 100 that are connected together to define an enclosed interior volume defined by hollow chambers 138 and a first through passage 146 (or 148). In the illustrated example suitable for multi-story commercial building floors, the conduit units 100 are encased in concrete 440. In an exemplary installation method, a first layer of concrete 430 can be poured and can at least partially cure. The vault structure 400 is then assembled through connection of a plurality of modular units 100 as described herein on top of the at least partially cured first lift or subfloor. A second layer of concrete 440 is then poured over and around the conduit structure 400 to permanently encase it while substantially or completely preventing the concrete from entering the hollow interior chambers 138 thereby providing one or more through passages 146/148 which the utility line 420 can be routed. Depending on the application and size of the units, the through passages may further provide a crawl space to service lines, cables or other structures routed which are not easily removed. It is understood that materials other than concrete may be used to surround or encase the conduit units depending on the application and performance specifications.

Figure 13:
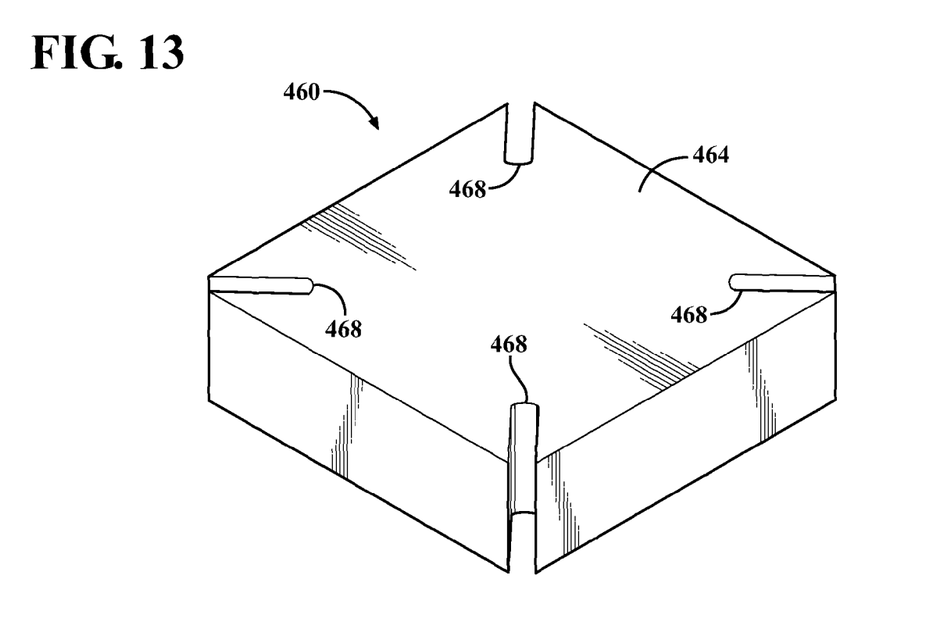
FIG. 13 is a perspective view showing an exemplary connecting conduit member.

Referring to FIG. 13, an example of a conduit unit base connector 460 is shown. In the example, base connector 460 includes a body 464 defining four slots 468 as generally shown. In the preferred example, base connector 460 is square, the slots 468 are formed at the corners and extend through a thickness of the body.

Figure 14:
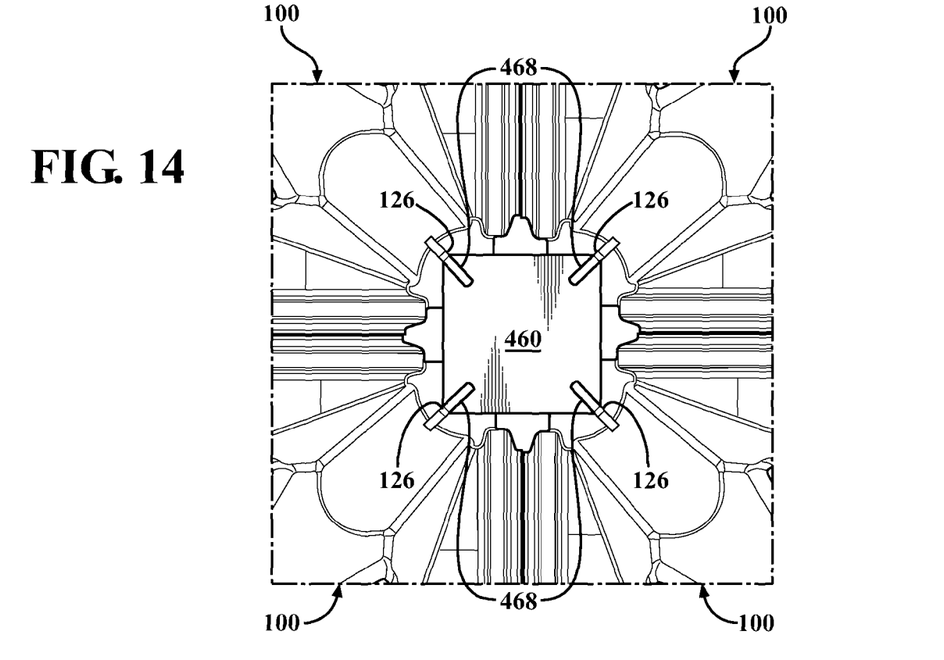
FIG. 14 is a top view showing four exemplary conduit units interconnected by the exemplary FIG. 13 connecting member.

As best seen in FIG. 14, an example of use of a base connector 460 is shown to assist in orienting and connecting four adjacent conduit units 100 together. In the example, a base connector may be installed between the adjacent legs 120 of the four units so that the upstanding plate member 126 atop of the foot pads 124 engages a respective slot 468 for each leg 120. In a preferred example, the frictional engagement between base connector 460 and the plate members 126 will be sufficient to provide the required additional stability and orientation of the adjacent conduit units during an installation process, for example, installation of backfill material around the unit structure as generally described herein. It is understood that other structures and engagements with conduit units 100 to provide increased stability or orientation may be used as known by those skilled in the art.

Figure 15:
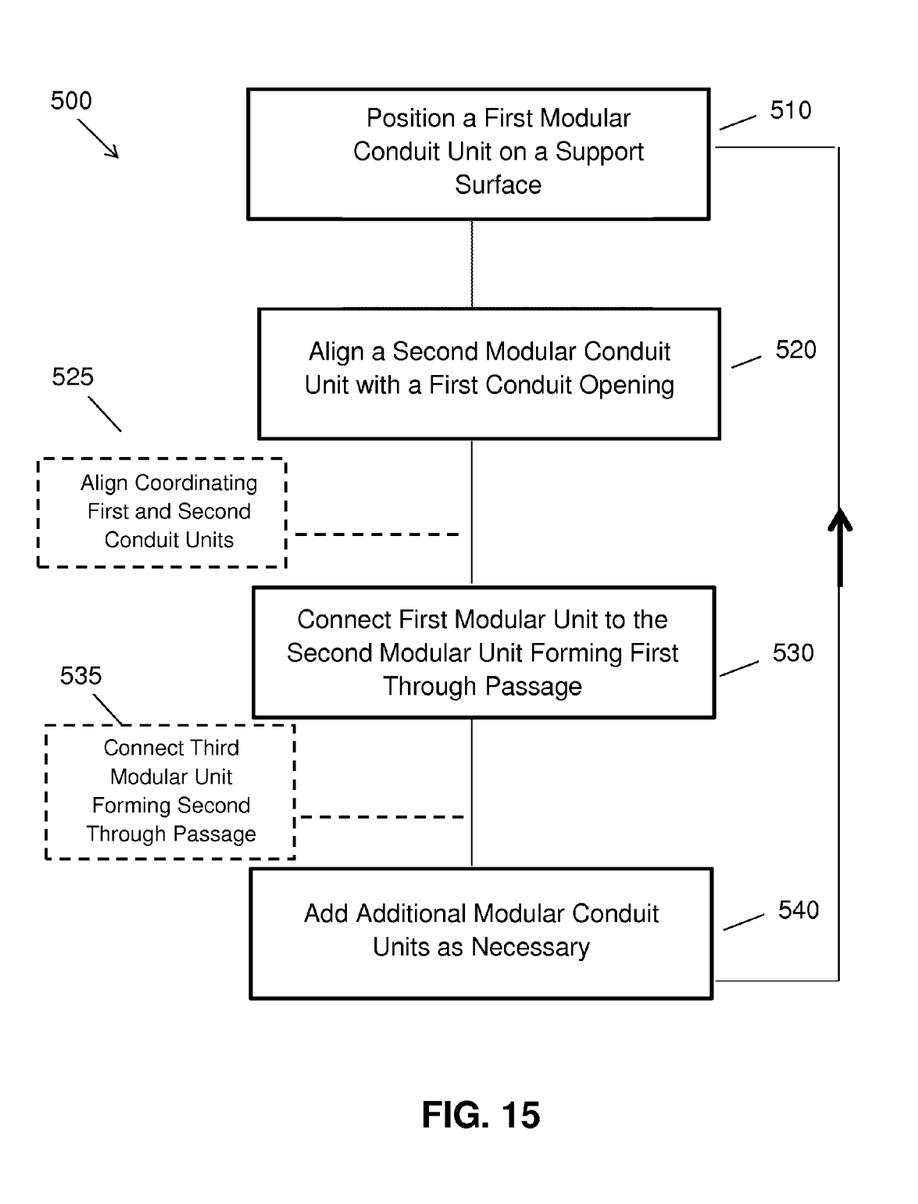
FIG. 15 is a schematic flow chart of an example of a method of constructing a modular conduit unit structure.

Referring to FIG. 15, an exemplary process to form a modular conduit unit 500 is illustrated. In an exemplary step 510, a first modular conduit unit 200 having four sides 101-104, four respective openings 141-144 along respective axes 128 and 129 and an interior hollow chamber 128 is placed on a support surface. The support surface may be a hard permanent surface such as concrete, a porous or other material as described herein.

In exemplary step 520, a second modular conduit unit 210 having the same or substantially the same structure as first conduit unit 200 is oriented along one of the respective axis 128 or 129 to align one of a respective opening 141-144 with a respective one opening 141-144 of the first modular conduit unit.

In an optional step 525, a first connector portion or a second connector portion on the first conduit unit 200 is aligned with a coordinating second connector portion or first connector portion of the second conduit unit 210.

In step 530, the first 200 and the second 210 conduit units are connected together defining a first through passage 146 along first chamber axis 128 (or second through passage 148 along axis 129).

In an alternate step 535, a third 290 modular conduit unit is connected to the first 200 (or second 210) modular unit defining a second through passage 148 along second chamber axis 129 (or first through passage 148 along axis 128).

In exemplary step 540, the method steps of connecting additional modular conduit units 100 are repeated along one or both of the first 128 and second 129 chamber axes to define additional first 146 and second 148 passageways for the desired application or spatial environment at the work site.

In alternate method step not illustrated, one or more closure panels 250 are selectively connected to a respective conduit unit opening 141-144 on one or more first 200 and second 210 conduit units to close or terminate the opening or first 146 and/or second 148 passageways.

In an alternate step not shown, one or more utility lines or cables are routed through one or both of the first 146 and second 148 through passages defined by the plurality of connected modular conduit units 100 and or 200, 201.

In an alternate method step not illustrated, once the designed number of modular conduit units are connected and installed on the support surface in the designed location and configuration, material is deposited around and on top of the connected modular conduit units to encase at least a portion of the connected conduit structure. In an alternate step of installing closure panels 250 not shown, closure panels 250 are installed on all, or substantially all, exterior facing openings 141-144 of the structure to form a fluid retaining reservoir or enclosure, for example stormwater retention and management.

In an alternate method step not shown, the connected desired number and configuration of first 200 and second 210 modular conduit units are encased in concrete in a respective floor or wall of a single or multi-story commercial building.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A modular conduit unit for use in defining a passageway or storage volume, the conduit unit comprising:

A bottom portion comprising four legs defining a first, a second, a third and a fourth side orthogonally positioned with respect to one another and each further defining a respective first, a second, a third and a fourth opening, two of the first, the second, the third and the fourth openings positioned along a first chamber axis and the other two of the first, the second, the third and the fourth openings positioned along a second chamber axis, each of the four legs further comprising a foot pad having a plate member extending outwardly from the foot pad;

a top portion connected to the bottom portion, the top and bottom portions defining an interior chamber volume beneath the top portion in communication with the first, the second, the third and the fourth openings defining at least one first through passage between two of the first, the second, the third or the fourth openings;

a connector attached to the bottom portion adapted to connect a second modular conduit unit to the bottom portion to extend the through passage passageway and increase the interior chamber volume; and a base connector, the base connector defining a plurality of slots adapted for engaging the respective foot pad plate member on adjacent modular conduit units to position and orient the respective modular conduit units to one another.

2. The conduit of claim 1 wherein each of the first, the second, the third and the fourth sides extend angularly inward toward a longitudinal axis from a bottom portion of the legs to the conduit unit top portion.

3. The conduit unit of claim 2 further comprising an arch extending outward along a respective one of the first or the second chamber axis from each of the first, the second, the third and the fourth sides, each arch defining a respective one of the first, the second, the third or the fourth opening; and the connector further comprising a first connector portion and a second connector portion, wherein the arches from two of the first, the second, the third and the fourth sides include the first connector portion and the arches from the other of the two of the first, the second, the third and the fourth sides include the second connector portion.

4. The conduit of claim 3 wherein each one of the respective first, the second, the third and the fourth openings comprise a rounded upper portion having a diameter and a lower portion having a width, the lower portion width greater than the upper portion diameter.

5. The conduit of claim 3 wherein the first connector portion comprises a rounded protrusion extending radially outward from the respective first or second channel axis and continuously along the entire periphery of the respective arch.

6. The conduit of claim 5 wherein the second connector portion comprises a recessed channel defined by the arch and facing the respective of the first, the second, the third or the fourth opening, the recessed channel oriented to receive the rounded protrusion of an adjoining modular conduit unit.

7. The conduit unit of claim 1, further comprising a closure panel selectively connected to at least one of the first, the second, the third or the fourth sides to close the respective one of the first, the second, the third or the fourth openings.

8. A modular conduit unit for use in routing lines or storage management of fluids, the modular conduit unit comprising:
at least a first and a second independent modular conduit units, each modular conduit unit further comprising:
a bottom portion having four legs defining a first, a second, a third and a fourth side positioned orthogonally to each other,
a first channel axis and an intersecting second channel axis each extending through respective two of the opposing of the first, the second, the third or the fourth sides
an arch extending outward along a respective one of the first and the second channel axis from each of the first, the second, the third and the fourth sides, each arch defining a respective first, second, third and fourth through opening;
a top portion connected to the bottom portion, the top and bottom portions defining an interior chamber volume beneath the top portion in communication with the first, the second, the third and the fourth through openings;
a first through passage defined by the interior chamber and two of the opposing of the first, the second, the third and the fourth openings positioned along the first channel axis; and
a second through passage defined by the interior chamber and the other of the two opposing of the first, the second, the third and the fourth openings positioned along the second channel axis;
a connector for attaching one of the arches positioned along the first channel axis of the first modular conduit unit to one of the arches positioned along the first channel axis of the second conduit thereby extending the first through passage and interior chamber volume through the first and the second conduit units; and
a plurality of base connectors, each base connector defining openings for engaging receipt of plate members connected to a respective leg of adjacent modular conduit units, the base connectors adapted to secure spatial orientation of adjacent modular conduit units with respect to one another.

9. The modular conduit unit of claim 8 further comprising:
a third independent modular conduit unit connected to the first modular conduit unit arch positioned along the second channel axis thereby extending the second through passage and interior chamber volume through the first and the third conduit units.

10. The modular conduit unit of claim 8 wherein the at least a first and a second modular conduit units comprise a plurality of independent modular conduit units selectively connected to respective arches along the first and the second channel axes defining a plurality of the first through passages, a plurality of second through passages and a plurality of the interior chamber volumes in communication with one another.

11. The modular conduit unit of claim 8 wherein the connector further comprises:
a first connector portion attached to two opposing of the first, the second, the third or the fourth sides positioned along the first channel axis; and
a second connector portion attached to the other of the two opposing of the first, the second, the third or the fourth sides positioned along the second channel axis, the second connector portion engageable with the first connector portion to connection of the first modular conduit unit arch having a first connector portion to the second modular conduit unit arch having a second connector portion.

12. The modular conduit unit of claim 11 wherein:
the first connector portion comprises a rib radially extending outwardly from a periphery of the respective arch; and
the second connector portion comprises a recess channel defined by the arch, the recess channel oriented to face the respective first, second, third or fourth opening for engaging receipt of a first connector rib of an adjoining modular conduit unit.

13. The modular conduit unit of claim 8 further comprising:
a plurality of closure panels selectively connected to a plurality of the first, the second, the third or the fourth openings to selectively one or both ends of the first through passage or the second through passage.

* * * * *